United States Patent [19]
Habermann et al.

[11] 3,787,100
[45] Jan. 22, 1974

[54] DEVICES INCLUDING ROTATING MEMBERS SUPPORTED BY MAGNETIC BEARINGS

[75] Inventors: Helmut Habermann, Vernon, France; Roger Loyen, deceased, late of Vernon, France by Ghislaine Loyen nee Voisen, administratrix; Pierre Joly, Vernon; Yvan Auber, Rueil Malmaison, both of France

[73] Assignee: Etat Francais represente par le Ministre d'Etat charge de la Defense Nationale Delegation Ministerielle pour l'Armement Direction Technique des Engins Laboratoire de Recherches Balistiques et Aerodynamiques, Paris, France

[22] Filed: Dec. 11, 1972

[21] Appl. No.: 313,679

[52] U.S. Cl. .............................. 308/10, 74/5.6
[51] Int. Cl. .................................. F16c 39/06
[58] Field of Search .................. 308/10; 74/5.6

[56] References Cited
UNITED STATES PATENTS

| | | | |
|---|---|---|---|
| 3,399,002 | 8/1968 | Atkinson | 308/10 |
| 3,490,816 | 1/1970 | Lyman | 308/10 |
| 3,565,495 | 2/1973 | Lyman | 308/10 |
| 3,619,014 | 11/1971 | Quick | 308/10 |

Primary Examiner—R. Skudy
Attorney, Agent, or Firm—Roberts B. Larson et al.

[57] ABSTRACT

A gyroscope including a rotating member which is supported by a pair of magnetic bearings. Each bearing has two detectors for providing signals representative of the relative position of the member with respect to a common axis of the two bearings along first and second directions perpendicular to the axis and to each other. A feed-back loop controls biasing means in each bearing assembly and includes, for each direction, a summation circuit which sums the signals from the detectors corresponding to that direction in the two bearings and applies correction signals increasing with the summed signals to the biasing means corresponding to the directions in the two bearings. A subtracting circuit subtracts the signals from the detectors corresponding to the considered direction in the two bearings and applied correction signals to the biasing means, but through a polarity inverter in one of the bearings.

11 Claims, 10 Drawing Figures

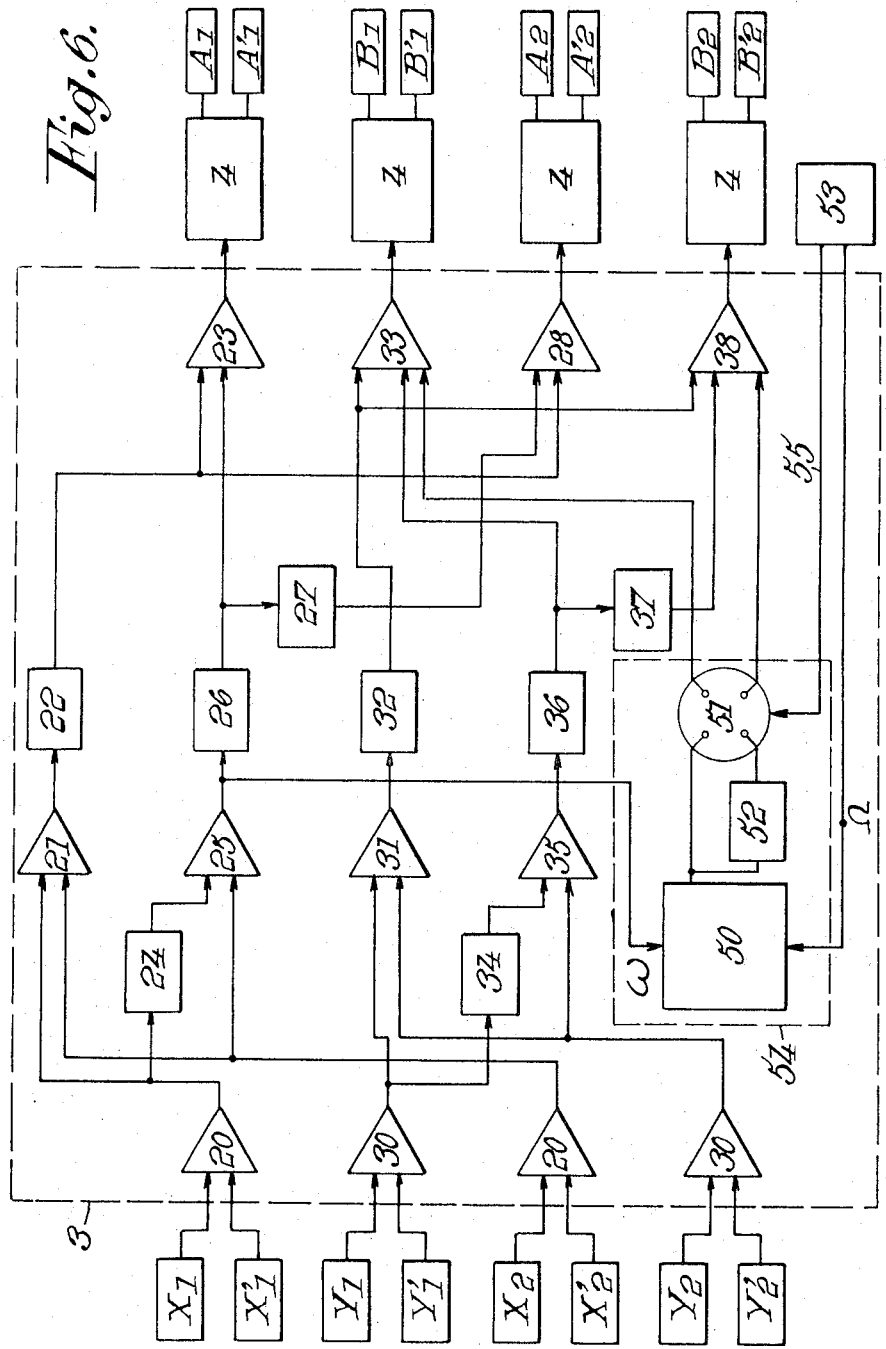

3,787,100

BACKGROUND OF THE INVENTION

The invention relates to devices which include a rotating member which is supported by magnetic bearings adapted to retain the rotating member in proper position without the use of conventional bearings.

The type of apparatus to which the present invention is particularly suited is a gyroscopic apparatus which may be used in communication satellites. However, it may also be used for other systems, particularly where precision of operation, freedom from frictional effects and high speed of rotation are required, for instance in turbo-molecular pumps and in ultra-centrifugers for isotopic separation.

The advantages of the magnetic bearings over conventional bearings in special environments are well-known. Magnetic bearings are rugged, simple in design, reliable and friction free. They are suitable for operation in a vacuum and this is a definite advantage in space. However, the prior art magnetic bearings have exhibited some attendant disadvantages. When the rotation speed and the weight of the rotating member exceed relatively low values, the rotating member constitutes a gyroscope. Then, the rotating member may develop precession movements and/or nutation movements. The amplitude of such movements may be such as to result in a positive contact between the rotating parts and the stationary parts of the magnetic bearings, thereby resulting in fast wear and tear of the bearings.

The servo-loops of prior art "active" magnetic bearings have failed to tackle the problem adequately. Most servo-loops of the prior art provide and individual feedback : in each bearing a plurality of detectors detect a misalignment of the axis of the rotating member in a predetermined radial direction and energize respective coils of that same bearing for exerting a centralizing force, phase advance networks having an appropriate frequency response being provided, or each detector controlling a coil angularly offset from the detector for achieving stability. In fact, problems are encountered because a large phase advance is necessary at high speed and the frequency of the nutation movements to be restrained considerably increases when speed increases from rest to the value in operation.

SUMMARY OF THE INVENTION

It is an object of the invention to provide an improved device in which the above-mentioned drawbacks of the prior art magnetic bearings are overcome.

It is a more specific object of the invention to provide a device in which the precession and nutation movements of the rotating member are efficiently dampered by appropriate feedback servo-loops.

It is still a more specific object of the invention to provide a device in which relatively independent servo-loops are used to restrain movements in the nature of oscillations (at low speed) and precession (at high speeds) and to restrain pendulum movements of the rotary member about its center of gravity and nutation movements.

The invention will be better understood from a consideration of the following description of preferred embodiments of the invention, given by way of non-limitative examples.

BRIEF DESCRIPTION OF THE DRAWINGS

The description refers to the accompanying drawings, wherein :

FIG. 6 is a block diagram similar to that of FIG. 3, but according to a modified embodiment of the invention suitable for operation at very high rotational speeds;

DESCRIPTION OF PREFERRED EMBODIMENTS OF THE INVENTION

Figure 1:
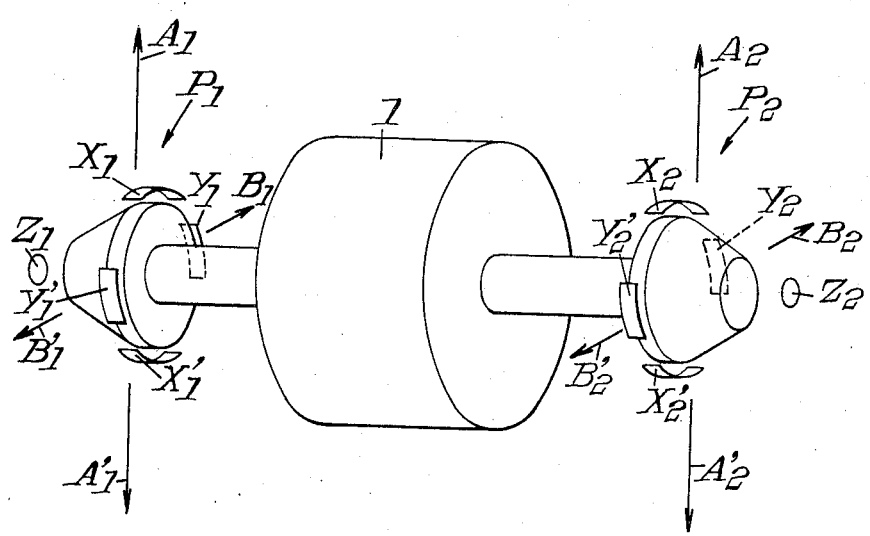
FIG. 1 is a schematic isometric view of some of the components of a device according to the invention.

Referring first to FIG. 1, there is shown the rotating member 1 of a device which may be a gyroscope. The two terminal portions of the rotating member 1 are supported by two magnetic bearings $P_1$ and $P_2$. In the embodiment of FIG. 1, the same magnetic bearings are so designed that they are adapted to counteract movements of the rotating member 1 from its normal axial and radial position.

However, for more clarity, no reference will be made to the effect of axial movements and how they are restrained.

Each magnetic bearing $P_1$ or $P_2$ comprises electromagnets which are schematically indicated on FIG. 1 by arrows whose directions indicate the forces they can exert on the rotor of the corresponding bearing. Each bearing preferably comprises four electro-magnets. The electro-magnets of bearing $P_1$ are designated by the references $A_1$, $A_1'$, $B_1$, $B_1'$. The electro-magnets of bearing $P_2$ are designated $A_2$, $A_2'$, $B_2$, $B_2'$. For more clarity, it will be assumed that the electro-magnets $A_1$, $A_1'$, $A_2$, $A_2'$ are located to exert vertically directed forces, while the electro-magnets $B_1$, $B_1'$, $B_2$, $B_2'$ are located to exert horizontally directed forces. Each electro-magnet can only exert a force which tends to bias the rotor towards the magnet, or, in other words, a pulling force.

Although this is not essential, each bearing $P_1$ or $P_2$ may have eight coils 2 constituting four pairs of coils connected in series relation (FIG. 2), each pair constituting an electro-magnet.

Each bearing $P_1$ or $P_2$ also comprises at least a pair of detectors for picking off radial displacements of the axis of the rotating member in two directions, from a normal position centered within the corresponding bearing. Two pairs of diametrically opposed detectors are however provided, since appropriate coupling of diametrically opposed detectors makes it possible to eliminate signals due to geometrical defects of the rotor. Bearing $P_1$ includes two detectors $X_1, X_1'$ which are diametrically opposed along a vertical diameter of the bearing, and two detectors $Y_1, Y_1'$ which are similarly diametrically opposed along a horizontal diameter of the bearing. Similarly, bearing $P_2$ includes four detectors $X_2, X_2', Y_2, Y_2'$.

Last, there are provided two detectors adapted to provide a signal indicating the amount of axial deflection of the rotating member from its normal position where it is centered between the bearings. The two axial detectors are referred to as $Z_1, Z_2$ and are respectively associated with the bearings $P_1, P_2$.

Figure 2:
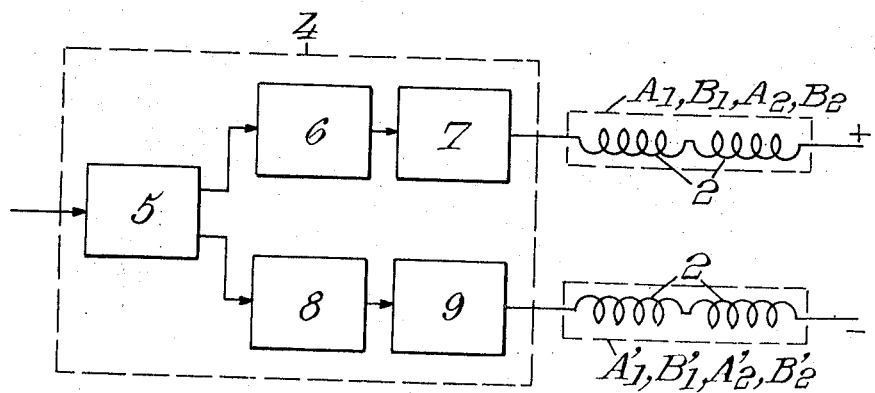
FIG. 2 is a block diagram of an electronic circuit of the servo-loop of the device of FIG. 1.

Each pair of electro-magnets is associated with a control amplifier 4 of the type illustrated in FIG. 2. Each amplifier 4 includes a selecting network 5 which provides an output signal on either of its two outputs depending upon the polarity of the input signal. One of the outputs, which is for instance energized if positive signals are received, is connected to a linearizing circuit 6 and a power stage 7. The linearizing circuit is intended to increase the stiffness of the bearing for small amount of deflection. It may consist of an amplifier provided with a diode in a counterfeed-back loop. The quadratic form of the initial portion of the dynamic characteristic of the diode compensates for the quadratic response of the electro-magnets. The power stage may consist of a push-pull amplifier and provides an output current in direct proportion with the control voltage applied on its input. The current delivered by the power stage 7 is circulated in one of the electro-magnets $A_1, B_1, A_2, B_2$.

Similarly, the negative signals cuase the selector circuit to energize the branch consisting of energizing circuit 8, power stage 9 and one of the electro-magnets $A_1', B_1', A_2', B_2'$.

It appears from the foregoing that each amplifier 4 and the associated electro-magnet constitutes a linear system which may receive any signal or combination of signals without reacting on another system.

Before a description of the servo-loops is given, a brief description of the possible movements to be restrained is given in order for easier understanding of the operation.

Assuming that the rotary member is accelerated from rest up to a high rotational service speed $\Omega$, the following movements may occur :

1. At low rotational speed, during start up, the rotating member behaves like a weight whose ends are retained by respective pairs of crossed springs.

The rotating member may take oscillatory movements with the axis of rotation moving alternately to either side of the common axis of the bearings, while remaining parallel to the common axis of the bearings; the resonant frequency of such movements, which will be referred to as "oscillatory movements," is independent from the rotational speed.

The rotating member may oscillate about an axis transverse to the rotation axis and traversing the center fo gravity of the member. If the member is entirely symmetrical, then the resonant frequency $\omega_o$ of such movements is the same whatever the transverse axis. Such movements, which will be referred to as "pendulum movements," give way to signals which have the same amplitudes, but are 180° offset, provided by the detectors in bearings $P_1$ and $P_2$.

2) When the speed increases beyond a value which depends on the weight and moment of inertia of the rotating member, there appear nutation and precession movements. As shown on FIG. 4, the resonant frequency of the precession movement steadily decreases up to a value $\omega_p$ at normal operation speed $\Omega_o$, while the nutation frequency increases up to a value $\omega_n$ at speed $\Omega_o$.

The detectors in both bearings will deliver signals in phase responsive to translation movements and signals out of phase by 180° responsive to nutation and precession movements.

Figure 3:
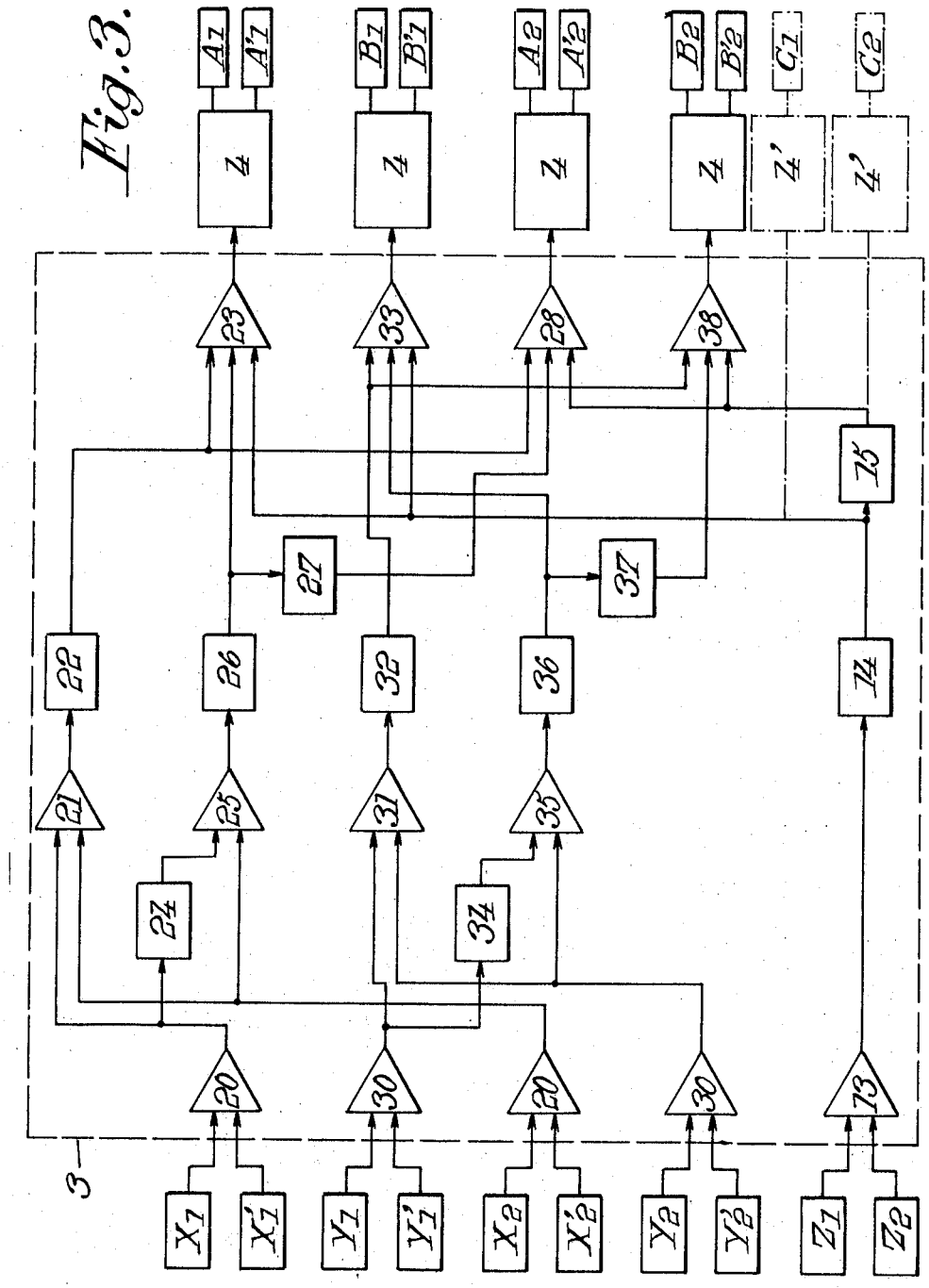
FIG. 3 is a block diagram of a feed-back loop for the device of FIG. 1, adapted for operation from low speed up to relatively high speeds.

Referring now to FIG. 3, there is shown a servo-system 3 having separate feed-back loops for restraining oscillatory movements and for restraining pendulum or conical movements.

Two identical loops are provided for fulfilling the first purpose. A first loop is effective against movements in the $X_1 X_2 - X_1' X_2'$ plane. It comprises two summation circuits 20 and $20_a$ each associated with a pair of detectors $X_1 X_1'$ or $X_2 X_2'$ respectively, so connected that the summation circuit provides a signal whose amplitude increases with the deflection and whose polarity indicates the direction of deflection. The summing circuit may consist of an amplifier whose inputs receive the signals from the detectors through resistors of equal values.

The signals from both summation circuits 20 and $20_a$ are applied to a summation circuit 21 : the output of 21 will provide an indication of the amount of average radial misalignment in the two bearings, that is a signal essentially representative of the amplitude of oscillatory or precession movements only. The signal is fed to a phase advance network 22, which may be an integrating — differentiating amplifier whose time constants are so selected that phase advance occurs in a frequency band corresponding to the resonant frequencies likely to occur.

In gyroscopes for satellite use, in which the mass of the rotating member is about 10 kg, the frequency band may be 20 - 80 Hz, with a maximum phase advance of about 30°. The signal from the hase advance network is simultaneously applied through summation circuits 23 and 28, whose purpose will appear later, to the control amplifiers 4 of the electro-magnets $A_1 A_1'$ and $A_2 A_2'$ for parallel action on the rotating member by the two bearings in the $X_1 X_1' X_2 X_2'$ plane.

A similar servo-loop associated with detectors $Y_1 Y_1' Y_2 Y_2'$ consists of summation circuits 30, $30_a$ and 31, phase advance network 32 and summation circuits 33 and 38 for actuation of the amplifiers associated with electro-magnets $B_1 B_1' B_2 B_2'$.

The lower limit of the phase advance frequency band should be low enough to include $\omega_p$, and high enough to include $\omega_o$.

In addition, the gain of the servo-loops at very low frequencies is preferably selected at a substantial value to prevent slow drift, which would result in misalignment, from occuring.

As a consequence, several networks having different RC time constants will preferably be located in series relation for providing a first narrow phase advance band at very low frequencies and a second narrow band in the range of oscillatory and precession frequencies.

Two feed-back loops are provided for restraining pendulum and nutation movements. The loop intended to exert dampening forces in the $X_1 X_1' X_2 X_2'$ plane comprises a summing circuit 25 which receives the signals from the summation circuit $20_a$ of detectors $X_2 X_2'$ directly and the signals from the summation circuits 20 of detectors $X_1 X_1'$ through an inverter 24. The outupt of summing circuit 25 is applied to a broad band phase advance circuit 26 which may be of the type illustrated in FIG. 5 and which will be described later. Phase advance circuit 26 should be effective for stabilization up to the resonant frequency $\omega_n$ and from frequency $\omega_o$.

The output from circuit 26 is applied to the electromagnet $A_1$ or $A_1'$ and, after dephasing by 180°, to the electro-magnet $A_2$ or $A_2'$ for restraining movements which result in displacements offset by 180° in the two bearings. For that purpose, the output of circuit 26 is connected to an input of 23 directly and to an input of 28 through an inverter 27.

Similarly, the feed-back loop for opposing movements in the $Y_1 Y_1' Y_2 Y_2'$ plane includes a summing circuit 35 fed by $30_a$ directly and by 30 through an inverter 34, a phase advance circuit 36, and an inverter 37 on the output branch to summation circuit 38.

Figure 5:
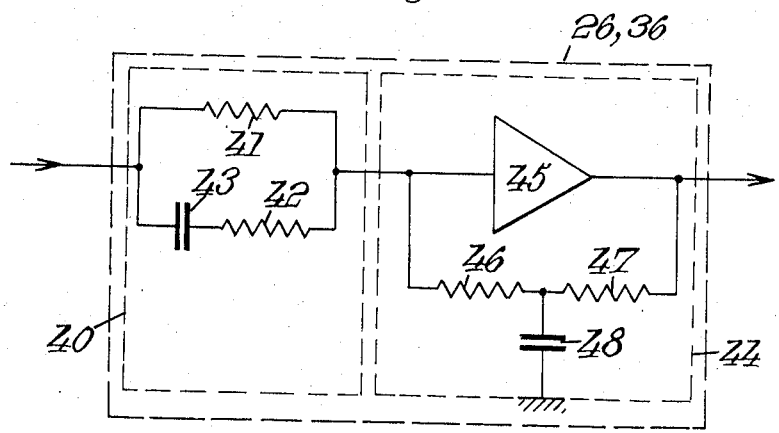
FIG. 5 is a diagram of the connections for a component of the feed-back loop illustrated in FIG. 3.

The phase advance circuits 26 and 36 are preferably active rather than passive networks and may be constructed as illustrated in FIG. 5. The circuit of FIG. 5 may be considered as consisting of a resistor-condenser input network 40 and an output integrating-differentiating amplifier 44. In an embodiment of the invention which is representative of conditions actually found in the gyroscope technique for space use, with $\Omega = 200 - 250$ Hz, the RC networks should be provided for resulting in a phase advance comprised between 20° and 30° in the whole range from 10 Hz to 300 Hz, such range extending from the lowest precession frequency to the highest nutation frequency which may be experienced.

For that purpose, the input network 40 consists of two parallel branches, one of which consisting of a resistor 41 and the other of a resistor 42 and condenser 43 connected in series. The output circuit 44 consists of an amplifier 45 and a feed-back loop having a T network of two resistors 46, 47 whose connecting point is grounded by a condenser 48.

Depending whether the magnetic bearings are adapted to exert an axial biasing force or not, different servo-loops may be used for restraining axial movements of the rotating member from a position centered between the bearings.

If conical bearing rotors of the type schematically illustrated in FIG. 1 are used, then it is sufficient to provide a summation amplifier 13 receiving the signals from detectors $Z_1$ and $Z_2$ and a phase advance network 14 having a narrow band. The output of 14 is connected to the summation circuits 23 and 33 directly and to the summation circuits 28 and 38 through an inverter 15, as shown in broken lines on FIG. 4.

Figure 4:
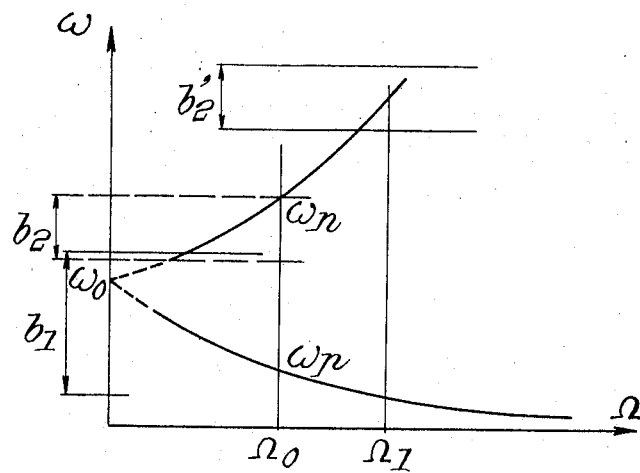
FIG. 4 shows a curve of the frequencies of nutation and precession plotted against the speed of rotation.

If on the contrary the bearing rotors are cylindrical, separate electro-magnets $C_1$ and $C_2$ exerting axially directed biasing forces should be provided and energized by separate amplifiers 4' alternately fed as indicated in dash-dot lines on FIG. 4.

Referring now to FIG. 6, there is shown a servo-system which includes additional circuits which make the device suitable for use at very high rotational speeds. At such high speeds, such as speed $\omega_1$ on FIG. 4, the frequency of nutation is much higher than the pendulum frequency at rest $\omega_o$. For the system of FIG. 4 to remain stable at such high speeds, the frequency band of the phase advance network 26 and 36 would have to extend up to high frequencies, with the result that it is much sensitive to noise.

In addition, instabilities may occur at high rotational speeds due to the fact that the rotating member and the stationary components of the bearings are not perfectly rigid.

For overcoming the difficulties, the circuit of FIG. 6 includes elements additional to those of FIG. 4. For more clarity, the components illustrated on FIG. 6 which have a counterpart on FIG. 4 are designated by the same reference numbers.

Referring to FIG. 6, there is shown a servo-system 3 which includes all components illustrated on FIG. 4 with the only difference that the phase advance circuits 26 and 36 have narrow bands. By way of example, there is shown on FIG. 4 a frequency band $b_1$ which includes all frequencies for which the phase advance provided by circuit 22 or 32 exceeds 20°. There is also shown a frequency band $b_2$ which is the band for which the circuits 26 and 36 provide a phase advance of 20° at least when the rotational speed $\Omega$ is close to 0. It shoud be noted that there is a slight overlap between the two bands.

The circuit of FIG. 6 includes additional circuit means which are intended to progressively shift the bandk $b_2$ when the rotational speed increases in order that the nutation frequency be included in that band at each speed up to the maximum service speed $\Omega_1$. In other words, the frequency band should be progressively shifted from $b_2$ to $b_2'$ on FIG. 4.

Such a result is achieved by providing a crossed network 54. Network 54 comprises an adapting network 50 which receives a signal at frequency $\omega$ from the output of the summation circuit 25 and a signal at frequency $\Omega$ from a speed sensing circuit 53. The network 54 also comprises an inverter 51 having two input terminals and two output terminals. One of the output is connected to an input of the summing circuit 33, while the other output terminal is connected to an input of the summing circuit 38. One of the inputs of the inverting switch 51 is connected to the output of network directly and the other is connected to that output through a polarity inverter 52. The connections between the inputs and outputs are controlled by the polarity of a signal received on line 55 from the sensing means 53 and indicating the direction of rotation of member 1.

Figure 7:
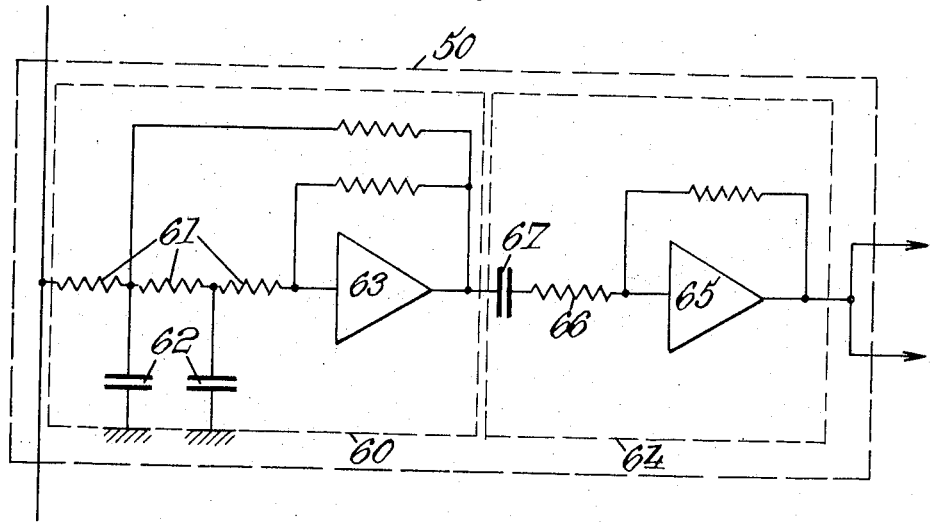
FIG. 7 is a diagram of a connection for a component of the feed-back loop of FIG. 6.

The adapting network 50 may be of the type illustrated on FIG. 7 although this is in no way exclusive. The network 50 of FIG. 7 comprises a second order low pass active filter 60 and a differentiating amplifier 64. The low pass filter 60 consists of an amplifier 63, a resistance 61 — condensator 62 input network, and feed-back resistors. The differentiating amplifier comprises a high gain amplifier 65 associated with a resistance feed-back loop and with an input circuit comprising a capacitor 67 and a resistance 66.

Since an input at frequency $\Omega$ is superimposed to the input at frequency $\omega$, the output provided with the proper polarity to the pairs of electro-magnets which are in the plane offset by 90° from the plane of the detectors $X_1 X_1'$ efficiently dampens nutation and makes it possible to dispense with the adjunction of a mechanical damper.

Figure 8:
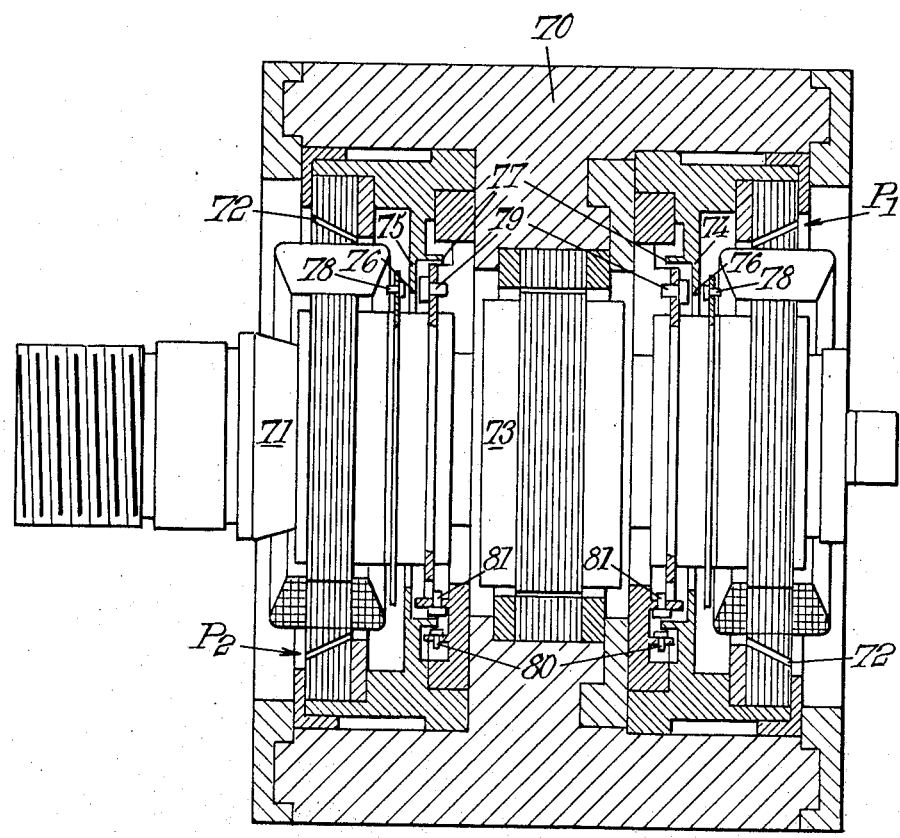
FIG. 8 is a side view and in section along an axial plane of an inertial wheel which is supported by magnetic bearings associated with a servo-loop of the type illustrated in FIG. 3 or 6.
Figure 9:
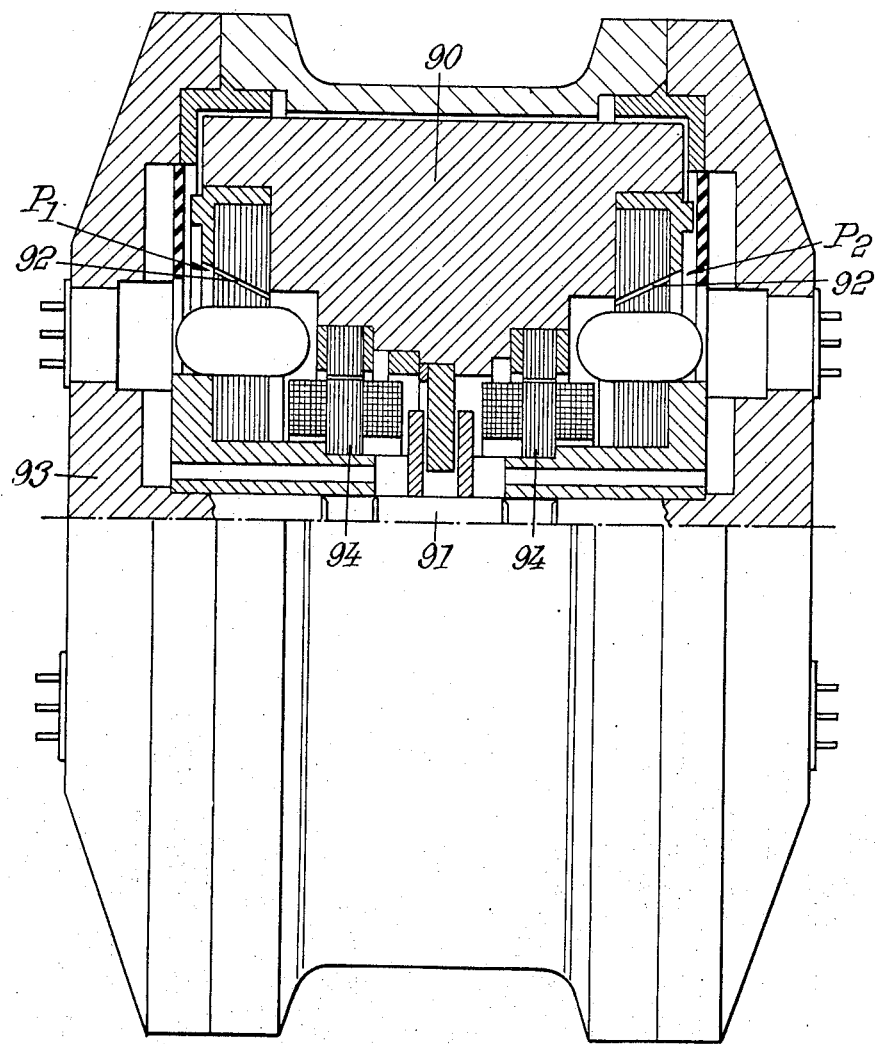
FIG. 9 is a side view, in section, of a gyroscope whose wheel is supported by magnetic bearings provided with a servo-loop according to FIG. 3 or 6.

Referring now to FIG. 8, there is shown an inertia wheel for use with the servo-system according to the invention. The inertia wheel comprises a rotating member consisting of an external rotor 70 carried by two magnetic bearings $P_1$, $P_2$ on an internal stator 71. The air gaps 72 of the magnetic bearings are conical for the same electro-magnets to be used in restraining the rotor both against radial and axial movements. The external rotor 70 is driven in rotation by a conventional electrical motor 73. The rotor is non rotatably connected with two light occultation disks 74 and 75, each having an inner radially directed flange 76 and an inner axially directed flange 77. The radial flange 76 cooperates with a first set of light sources, which can be laser diodes, and a first set of light sensors 79, which can be photo-transistors. Each light sensor 79 and the corresponding light source constitutes one of the eight radial position detectors. The axial flange 77 cooperates with a second set of light sources 80 and light sensors 81 which constitute the detectors $Z_1$ or $Z_2$ of the bearing Referring to FIG. 9, there is shown a gyroscope which is also suitable for use with a servo-system according to the invention. The gyroscope comprises a gyroscope rotor 90 supported by two magnetic bearings $P_1$, $P_2$ for rotation about a stationary axis 91. The air gaps 92 of the bearings are preferably conical for simultaneous radial and axial action on the rotor 90. An air tight housing 93 surrounds the gyroscope assembly and makes it possible to maintain a vacuum which reduces the friction and the heating of rotor 90 due to aerodynamical effects. The rotor 90 is driven by an electric motor 94. Eight detectors for picking off signals representative of the radial position of the rotor and two detectors for providing signals representative of the axial position are provided in the form of capacitive sensors, each capacitor having electrode plates constituted of metal coatings on ceramic plates.

Figure 10:
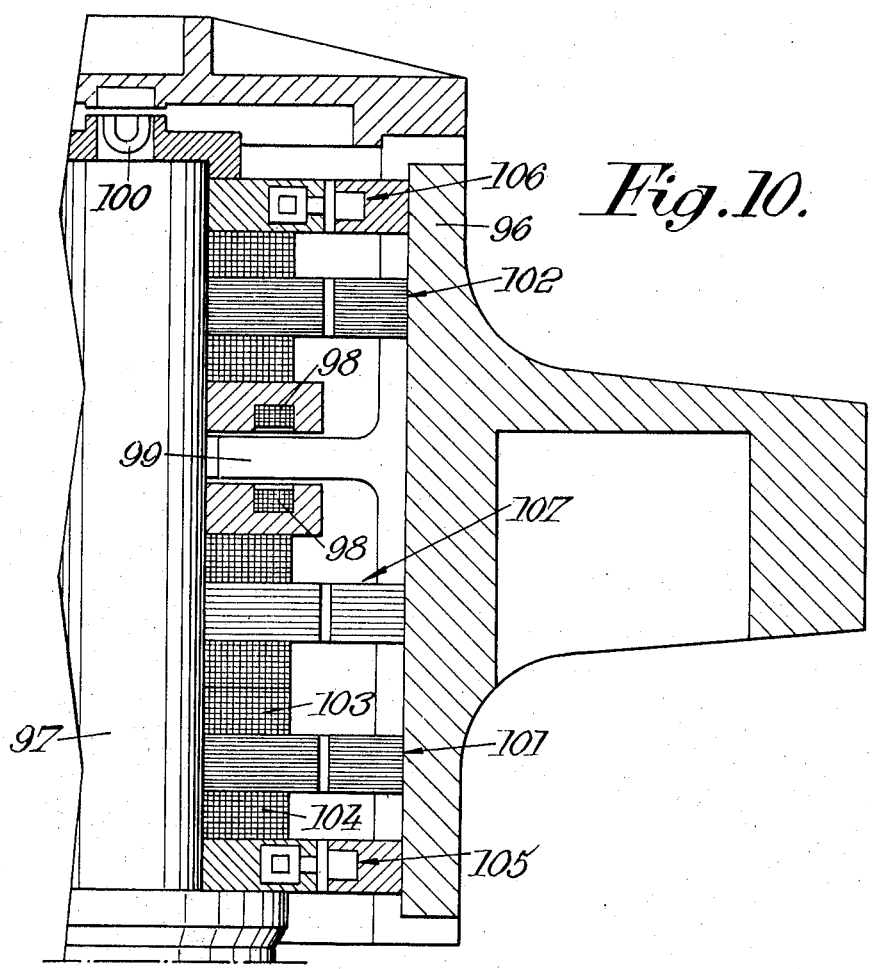
FIG. 10 is an axial section of another embodiment.

Referring now to FIG. 10, there is shown a gyroscope for use on satellites. The rotating wheel 96 of the gyroscope is carried by a shaft 97 whose axis is vertical during ground tests and launching. As a consequence, the axial restraining forces to be exerted on the wheel during tests are much higher than those in service and that the radial restraining forces. It is then preferable not to use conical magnetic bearings of the type illustrated on FIGS. 8 and 9, but rather cylindrical bearings for radial suspension and flat bearings for axial suspension. The flat bearings comprise a pair of windings 98 carried by shaft 97 and exerting an adjustable force on a radial flange 99 of the wheel which is adjustable in response to the signal delivered by a magnetic detector 100. Similarly the radial bearings 101 and 102 each comprises four pairs of windings, e.g., 103 and 104. Each bearing is also provided with two pairs of diametrically opposed magnetic detectors 105 and 106. The wheel is driven by a motor 107 carried by shaft 97. The servo-system may then be that illustrated in dash-dot lines on FIG. 3.

We claim:
1. A device having:
    a member rotatable about an axis thereof,
    two magnetic bearing assemblies for rotatably maintaining said member aligned along a common axis of said bearings,
    at least two detectors associated with each of said bearings for providing signals representative of the relative position of said member with respect to said common axis along first and second directions perpendicular to said common axis,
    controllable biasing means in each said bearing assembly, adapted to exert forces on said member along said first and second directions,
    and feed-back means responsive to said signals for controlling said biasing means, said feed-back means comprising, for each of said directions:
    first means for summing the signals from the detectors corresponding to that direction in said two bearings and for applying correction means increasing with the summed signals to the biasing means corresponding to said direction in the two bearings,
    second means for subtracting the signals from the detectors corresponding to that direction in the two bearings and for applying correction means increasing with said difference to the biasing means corresponding to said direction in said two bearings, through a polarity inverter in one of said bearing assemblies,
    and a phase advance circuit between each said summing and subtracting means and the biasing means energized thereby.

2. Device according to claim 1, wherein the biasing means in each said bearing comprises two pairs of diametrically opposed electro-magnets and two pairs of diametrically opposed detectors of radial position.

3. Device according to claim 1, comprising additional detector means for providing an output signal representative of the axial position of said rotating member.

4. Device according to claim 3, wherein energization of said biasing means exerts both an axial force and a radial force on the rotating member, and wherein said additional detector means are connected to the biasing means for said first and second directions simultaneously through phase advance means.

5. Device according to claim 1, wherein the phase advance means associated with said subtracting means have a passer band broader than that of said summing means.

6. Device according to claim 5, wherein each said broad band phase advance means comprises an input broad band phase RC network and an active output circuit comprising an amplifier having a resistor-capacitance feed-back loop.

7. Device according to claim 1, wherein each said biasing means receives energized signals from said summing and subtracting circuits through second summation circuits having several inputs each connected to at least one said first named summation means and at least one subtracting circuit.

8. Device according to claim 1, having a cross-circuit for dampening nutation movements, connected between the output of the subtracting means associated with the detectors providing signals representative of deflections in said first and second directions in one of said bearings and the biasing means active in said second or first direction, respectively.

9. Device according to claim 8, wherein cross-circuit comprises an adaptative network having an input connected to said subtracting means and another input connected to a generator providing a voltage at a frequency representative of the rotation speed of said member, said cross-circuit being constructed for having a narrow pass band which moves towards the higher frequency when said frequency increases.

10. Device according to claim 9, wherein said cross-circuit has a low pass filter network and a derivating network.

11. Device having:

a member rotatable about an axis thereof, two axially aligned magnetic bearing assemblies, each having first biasing means for exerting a biasing force on said member having a component along said axis and a component along a first direction transverse to said axis when energized and second biasing means for exerting a biasing force on said member having a component along said axis and a component along a second direction transverse to said axis and said first direction when energized, first and second detector means in each said bearing for providing signals representative of radial deflections of the axis of said member from the common axis of said bearings in said first and second directions, third detector means for providing signals representative of axial deflections of said member from a predetermined position, and feed-back means responsive to said signals for controlling said biasing means, said feed-back means comprising, for each of said directions in each bearing assembly:

first summing means for summing the signals from said first detector means associated with one of said bearings and the signals from said third detector means and for applying correction signals to the first biasing means of said associated bearing assembly which increases with the summed signals, first subtracting means for subtracting the signals from said first detector means associated with the other one of said bearings and the signals from said third detector means and for applying correction signals to the first biasing means of the associated bearings which increases with the subtracted signals, second summing means for summing the signals from said second detector means associated with the first one of said bearings and the signals from said third detector means and for applying correction signals to the second biasing means of the associated bearing which increases with said summed signals, and second subtracting means for subtracting the signals from said second detector means associated with said other bearing and the signals from said detector means and for applying correction signals to the second biasing means of the associated bearing which increases with said difference.

* * * * *